April 29, 1952 E. L. SCHAUB ET AL 2,594,810
METHOD OF RELINING WORN BEARING SURFACES
Filed June 15, 1949

INVENTORS:
ERWIN SCHAUB &
FREDRICK HERTEL JR.
BY John J. Lynch
Atty.

Patented Apr. 29, 1952

2,594,810

UNITED STATES PATENT OFFICE 2,594,810

METHOD OF RELINING WORN BEARING SURFACES

Erwin L. Schaub and Fredrick Hertel, Jr., Brooklyn, N. Y.

Application June 15, 1949, Serial No. 99,254

1 Claim. (Cl. 29—148)

This invention relates to a method and means of restoring the bearing supporting surface of a housing.

In various industrial uses, particularly in the automotive field shafts are supported on bearings in housings, to the interior of which access is difficult without extensive disassembly of the parts which is costly and time consuming. As an example in a fluid drive casing in an automotive vehicle, the only readily accessible face of the casing is shaped to provide a housing in which the ball bearing unit supporting the end of the shaft is tightly fitted. This close fit of the bearing may be lost, due to wear on the inner surface of the housing portion of the casing and in order for the fault to be corrected a new casing must be installed or the old one complete removed and reconditioned at great expense and loss of time.

It is an important object of our invention to overcome this objection by making it possible to replace the worn bearing surface of the housing without the necessity of dismantling all the parts of the unit to be reconditioned. A further object of the invention is to provide a method of carrying out the reconditioning operation as applied to a casing in use without necessarily removing the casing from the machine of which it forms a part or without the necessity of removing the shaft whose bearing is to be remounted in the casing for close force fit.

A still further object of the invention is to provide for replacing the worn surface of the bearing housing with means that supplies a new mounting for the bearing and a method that can be practised from outside the casings in present use which, in the bearing housing portion, are closed by a wall that forms an integral part of the casing.

Other important objects of the invention include the use of a method and means that may be used to advantage in any type of housing or casing, in the bearing end of which a shaft supporting member is encased in such a manner as to be highly inaccessible so that the work may be performed quickly, efficiently and at reduced cost.

Figure 1:
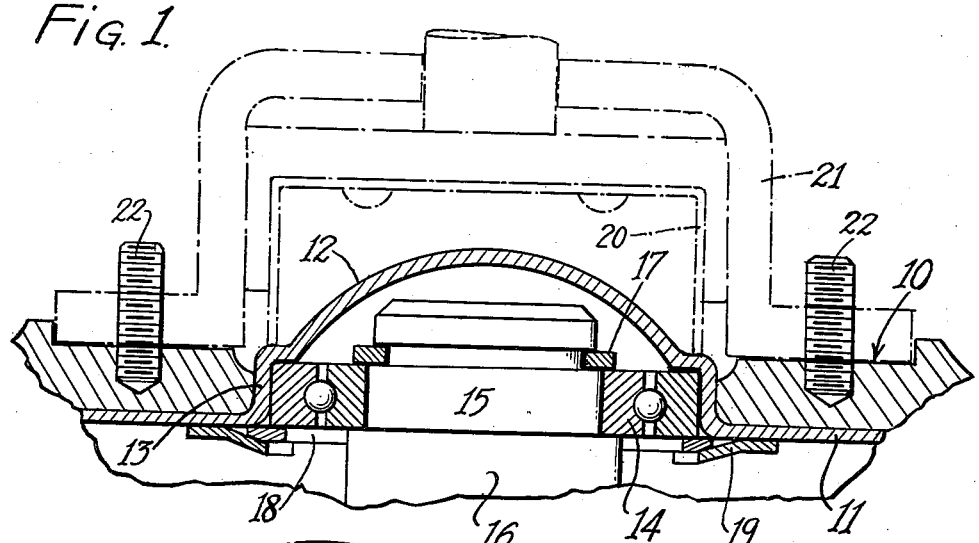
Figure 2:
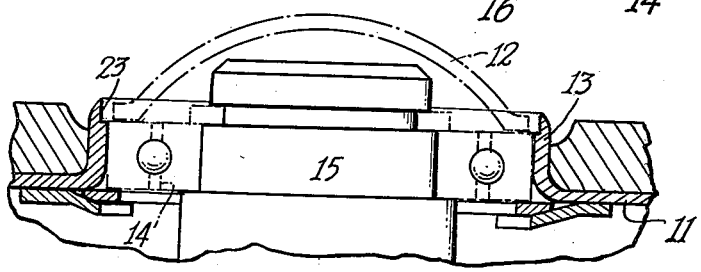
Figure 3:
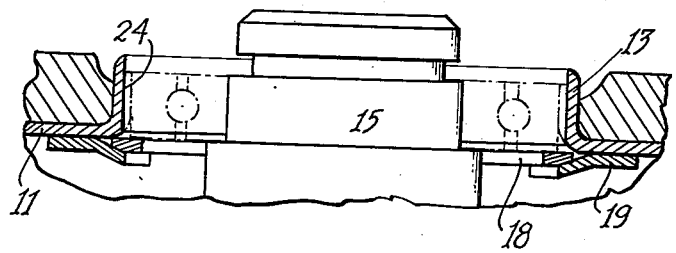
Figure 4:
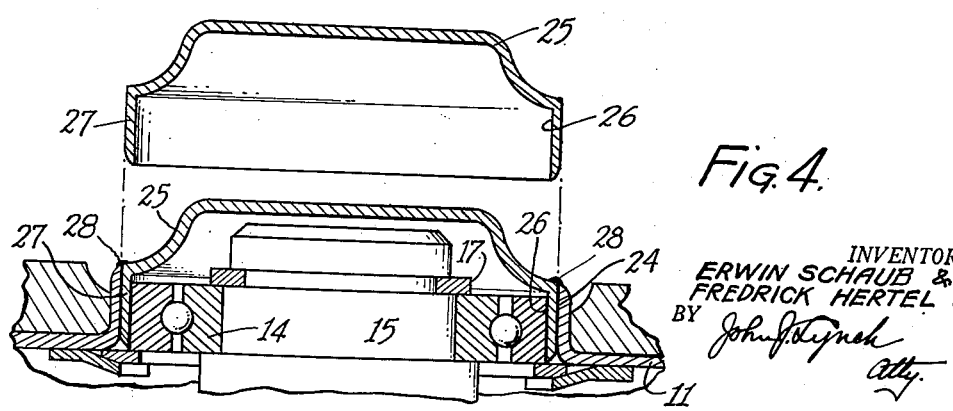

With these and other objects in view, the invention comprises certain construction hereinafter described and then particularly pointed out in the claim and a preferred embodiment of our invention is illustrated in the accompanying drawing in which:

Figure 1 is a fragmentary view in sectional elevation taken through the closed end of a casing in which a bearing housing is shown as an integral part thereof, Figure 2 is a view similar to Figure 1 showing the completion of the first step in the method, Figure 3 is a view similar to Figure 2 showing the completion of the second step in the method, and Figure 4 is a view similar to Figure 3 showing the method steps completed and also showing the means employed in the method to complete the reconditioning operation.

Referring to the drawing in detail 10 indicates, by way of example, the accessible end or side of the fluid drive casing as used in an automotive vehicle which includes the end wall 11 having formed integrally therewith a housing 12 or dome, the annular wall 13 of which provides a force fitted support for a bearing 14 in which an end 15 of a shaft 16 is journalled and secured in place by the lock ring 17. The end of the shaft extends into the domed part of the housing and the ball bearing 14 is held in place in the bearing housing by the caming snap ring 18 and its supporting tabs 19.

When the bearing 14 gets loose the shaft gets out of alignment and unsatisfactory conditions of operation occur. It has been found that wear occurs on the inner surface of wall 13 with the result that the bearing becomes loose. Correction of this condition necessitates replacement of the casing or reconditioning thereof by complete disassembly of the parts which is arduous and time consuming.

The process employed by us consists in using a ring saw 20 shown with its centering jig 21 mounted on the studs 22 of the casing. The saw and jig being commercially available are shown in outline and as a first step the ring saw cuts the dome or crown 12 through to leave the casing undercut as shown at 23 in Figure 2. The hardened steel of the ball bearing will limit the depth of saw cut to sever the crown 12. The bearing 14 can then be lifted off the end of the shaft 16 after the snap ring 17 has been detached.

The second step of the method consists in then reaming out the internal surface of the wall 13 as at 24, Figure 3, to a diameter closely approximating the outside diameter of a bearing cap 25 the inner wall 26 of the neck portion 27 of which is of such diameter that the cap 25 can be forced into position over the ball bearing 14 and into the reamed out neck or wall 13. During this step, the ring 18 may be removed if deemed necessary. The third and last step in the method consists of force fitting the cap 25 into place over the bearing after the latter has been replaced and then spot welding the cap 25 as at 28 to secure the same in place.

This method can be practiced from outside the casing without the necessity of dismantling the parts and while it is illustrated as used in connection with the fluid casing of an automotive vehicle drive it is to be understood that the method and means can be employed in connection with any appliance or machine where such servicing is indicated. The replacement of the bearing may involve the putting of a new bearing in place.

Our invention is not to be restricted to the precise details of construction shown since various changes and modifications may be made therein without departing from the scope of the invention or sacrificing the advantages to be derived from its use.

What we claim is:

In a method of relining the worn surface of an annular bearing gripping wall portion formed in the solid panel of an automotive fluid drive casing, the steps of cutting a circular opening in the casing concentric with and undercutting said annular wall portion to a depth limited by the bearing, removing the bearing through said opening, reaming out the internal surface of said wall to enlarge the diameter thereof, and then force-fitting the annular flange of a cap between said reamed out wall and the external surface of the replaced bearing to hold the latter firmly in place.

ERWIN SCHAUB.
FREDRICK HERTEL, Jr.

REFERENCES CITED

The following references are of record in the file of this patent:

UNITED STATES PATENTS

| Number | Name | Date |
| --- | --- | --- |
| 1,446,158 | Clymer et al. | Feb. 20, 1923 |
| 1,903,776 | Clark et al. | Apr. 18, 1933 |
| 1,931,469 | Davies | Oct. 17, 1933 |
| 1,987,415 | Padgett | Jan. 8, 1935 |
| 2,255,161 | Gray | Sept. 9, 1941 |
| 2,315,006 | Misch | Mar. 30, 1943 |
| 2,329,151 | Brady | Sept. 7, 1943 |